US 9,953,083 B2

(12) United States Patent
Singh (10) Patent No.: US 9,953,083 B2
(45) Date of Patent: Apr. 24, 2018

(54) SYSTEM AND METHOD FOR DETERMINING AN AUTHORITY RANK FOR REAL TIME SEARCHING

(75) Inventor: Vik Singh, San Jose, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 604 days.

(21) Appl. No.: 12/706,349

(22) Filed: Feb. 16, 2010

(65) Prior Publication Data

US 2011/0202513 A1 Aug. 18, 2011

(51) Int. Cl.
*G06F 17/30* (2006.01)

(52) U.S. Cl.
CPC .. *G06F 17/30864* (2013.01); *G06F 17/30867* (2013.01); *G06F 17/30637* (2013.01)

(58) Field of Classification Search
CPC ......... G06F 17/30035; G06F 17/30442; G06F 17/3053; G06F 17/30554; G06F 17/30699; G06F 17/30702; G06F 17/10; G06F 17/30; G06F 17/30864; G06F 7/00; G06F 17/30536; G06F 17/30867; G06F 17/30507; G06F 17/30528; G06F 17/30533; G06F 17/30637; G06F 17/28; G06F 17/30557; G06F 17/30516; G06F 17/3087; G06Q 30/02; G06Q 30/0241
USPC ................. 707/706, 729, 736, 769
See application file for complete search history.

(56) References Cited

U.S. PATENT DOCUMENTS

| | | | | |
|---|---|---|---|---|
| 5,832,447 A * | 11/1998 | Rieker et al. | | 705/2 |
| 6,801,909 B2 * | 10/2004 | Delgado | | G06F 17/30864 |
| 7,698,331 B2 * | 4/2010 | Carson et al. | | 707/728 |
| 8,126,820 B1 * | 2/2012 | Talan et al. | | 705/319 |
| 8,126,876 B2 * | 2/2012 | Curtiss et al. | | 707/721 |
| 8,260,789 B2 * | 9/2012 | Dumais et al. | | 707/706 |
| 8,667,026 B1 * | 3/2014 | Lee et al. | | 707/802 |
| 2002/0111943 A1 * | 8/2002 | Meltzer et al. | | 707/3 |
| 2002/0141613 A1 * | 10/2002 | Sansone | | G06K 9/00 382/101 |
| 2005/0228806 A1 * | 10/2005 | Haberman | | 707/100 |
| 2006/0069663 A1 * | 3/2006 | Adar et al. | | 707/1 |
| 2006/0212435 A1 * | 9/2006 | Williams et al. | | 707/3 |
| 2006/0294151 A1 * | 12/2006 | Wong et al. | | 707/200 |
| 2007/0192300 A1 * | 8/2007 | Reuther et al. | | 707/3 |
| 2007/0208613 A1 * | 9/2007 | Backer | | G06Q 10/107 715/234 |
| 2007/0233777 A1 * | 10/2007 | Bates et al. | | 709/202 |
| 2007/0271205 A1 * | 11/2007 | Aravamudan et al. | | 706/12 |

(Continued)

*Primary Examiner* — Scott A Waldron
*Assistant Examiner* — Andalib Lodhi
(74) *Attorney, Agent, or Firm* — Pillsbury Winthrop Shaw Pittman LLP (57) ABSTRACT

The present invention is directed towards a method and system for processing a real time increase in search requests for a common event. The method and system includes detecting an activity spike in user search request activity based on monitoring of user search requests over a defined period of time and determining source locations associated with the activity spike based on user search result activities. The method and system further includes associating the source locations with the user search request and thereupon applying a machine-learning model to determine a plurality of common features operative to cause the activity spike, including determining associations between the source locations and the activity spike.

23 Claims, 4 Drawing Sheets

(56) References Cited

U.S. PATENT DOCUMENTS

| | | | |
|---|---|---|---|
| 2008/0072264 A1* | 3/2008 | Crayford | 725/86 |
| 2008/0109285 A1* | 5/2008 | Reuther et al. | 705/7 |
| 2008/0140781 A1* | 6/2008 | Bocharov et al. | 709/206 |
| 2008/0154609 A1* | 6/2008 | Wasserblat et al. | 704/273 |
| 2008/0208820 A1* | 8/2008 | Usey | G06F 17/30616 |
| 2008/0255935 A1* | 10/2008 | Madhavan | G06Q 30/02 705/14.64 |
| 2008/0320087 A1* | 12/2008 | Horvitz et al. | 709/206 |
| 2009/0265205 A1* | 10/2009 | Stinchcombe | G06Q 10/06 705/37 |
| 2010/0036771 A1* | 2/2010 | Daniel et al. | 705/50 |
| 2010/0040220 A1* | 2/2010 | McGary et al. | 379/265.09 |
| 2010/0057945 A1* | 3/2010 | Takahashi | 710/15 |
| 2010/0076994 A1* | 3/2010 | Soroca et al. | 707/769 |
| 2010/0169265 A1* | 7/2010 | Ristock et al. | 706/52 |
| 2010/0250648 A1* | 9/2010 | Cao et al. | 709/203 |
| 2010/0281061 A1* | 11/2010 | Chen | 707/794 |
| 2010/0306235 A1* | 12/2010 | Mishne | 707/769 |
| 2011/0035402 A1* | 2/2011 | Agrawal | G06F 17/30876 707/769 |
| 2011/0087647 A1* | 4/2011 | Signorini et al. | 707/709 |
| 2011/0179017 A1* | 7/2011 | Meyers | G06Q 30/0254 707/722 |

\* cited by examiner

SYSTEM AND METHOD FOR DETERMINING AN AUTHORITY RANK FOR REAL TIME SEARCHING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to search engines and more specifically to systems and methods for processing and improving search results for current real-time trends and/or events.

BACKGROUND OF THE INVENTION

Traditional search engines deal with multiple sets of information corpora. In response to a search request, the search engine returns result sets in an ordered listing. The reliability of search results often depends on various factors, including the collection of the information, processing of the information, the information source and user feedback on the veracity of this information.

Problems can arise when there is a spike in activity for a particular search trend because of problems with not only determining the right contemporaneous information, but also the reliability of this information. Standard search terms can be easily and readily handled using existing search technology, for example a user conducting a search to find information on a vacation to Las Vegas.

But a spike in activity typically represents a corresponding real world occurrence and users seeking information as it becomes available. For example, suppose a natural disaster occurs or a rumor emerges that a company is about to launch a ground-breaking new product, there will be a corresponding in spike in people searching for this information.

Current web searching technology suffers from an ability to successfully account for contemporaneous information. There is a growing trend for highly contemporaneous information achieving a critical mass of distribution in a very short time frame. This increase in contemporaneous information is predicated on the wide use and quick dissemination of information occurring in the current electronic world.

The conversion of the Internet from a passive online informational source to a de facto medium for information distribution, combined with the new tools for increases contemporaneous content generation, complicates existing web searching technology. Examples of contemporaneous information may include data feeds, such as social media feeds, really simple syndication (RSS) feeds, web logs, etc. Prior techniques of crawling the Internet, cataloging and then searching these corpora suffer from a lack of proper accounting for these contemporaneous data sources.

With developments in search engine technology to account for these feeds, problems can arise in the reliability of this information. For example, just because a search engine may describe a social media feed that includes information relating to the event, there is no way to trust the source of this feed. Therefore, there exists a need for improving search results correlating to spikes in real time search activities by accounting for the authority of sources in the search result.

SUMMARY OF THE INVENTION

The present invention is directed towards a method and system for processing a real time increase in search requests for a common event. The method and system includes detecting an activity spike in user search request activity based on monitoring of user search requests over a defined period of time and determining source locations associated with the activity spike based on user search result activities. The method and system further includes associating the source locations with the user search request and thereupon applying a machine-learning model to determine a plurality of common features operative to cause the activity spike, including determining associations between the source locations and the activity spike.

The present invention further includes determining a plurality of fresh web content for a search engine and measuring a real-time authority for the fresh content using the machine-learning model. Therein, the method and system includes adjusting a reliability factor for the fresh web content based on the measured real-time authority. In one embodiment, the method and system, the adjustment of the reliability factor based on the measured real-time authority is performed instead of at least one of a link flux calculation and a page rank adjustment.

The present invention further includes determining the search terms of the user search requests associated with the activity spike and determining a plurality of additional content sources associated with the search terms. The system and method further includes ranking the plurality of additional content sources based on the measured real-time authority. The system and method additionally includes determining an additional processing capacity in the search engine caused by the activity spike and allocating available processing capacity of the search engine proportional to the additional processing capacity.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

As described herein, the search engine technology recognizes a spike or dramatic increase in user search activity for a particular event or theme. From that spike, the search engine is able to process search result options relating to real time sources. From the processing of those sources, the search engine therefore generates an authority rank for the real time sources. Using this authority rank improves the ordering of the search results.

Figure 1:
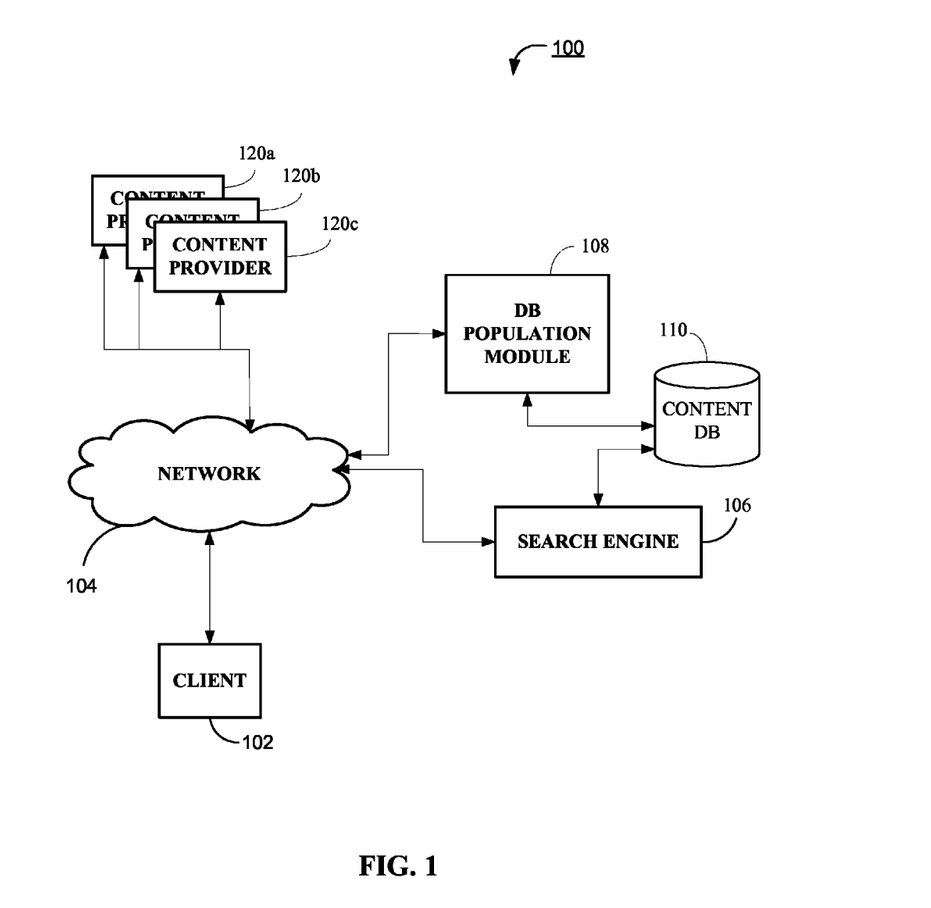
FIG. 1 illustrates one embodiment of a block diagram of a search result system that includes capabilities of providing search results for contemporaneous information.

FIG. 1 illustrates one embodiment of a system 100 that includes a user device 102, a network 104 and a search engine 106. The system 100 further includes a database population module 108 and a content database 110 usable by the search engine 106. In the system 100, additional content sources 120a, 120b and 120c are additionally connected via the network 104.

The user device 102 may be any suitable type of user processing device as recognized by one skilled in the art. In a typical embodiment, the user device 102 is a personal or mobile computing device that includes local processing capabilities, as well networking capabilities to interact and engage the network 104.

The network 104 may be any suitable type of network allowing data communication thereacross. In a typical embodiment, the network 104 is the Internet, following known Internet protocols for data communication thereacross.

The search engine 106 is one or more processing components disposed on one or more processing devices or systems in a networked environment. The search engine 106 may operate similar to known search engine technologies, but with the inclusion of additional processing capabilities describes herein. The search engine is operative to receive search requests and process the requests to generate search results to the user device 102 across the network 104. Whereas, the search engine 106 is additionally capable of recognizing a spike in search activity, recognizing contemporaneous sources of information, processing various details of information and thereby ranking the sources.

It is recognized that various details of the user device 102, network 104 and search engine 106 have been omitted. Many details, such as techniques for engaging and communication therebetween, not described herein are known within the knowledge of one skilled in the art and are omitted for brevity purposes only.

The database population module 108 is illustrated as being separate from the search engine 106, but it is recognized that this module may be incorporated therein. The database population module 108 is a processing device or system operative to perform processing operations in response to executable instructions, instructions for extracting search information relating to web-based content and then populating the content database 110. In one embodiment, the module 108 may include technology crawling Internet content to populate the database 110. Additionally, the module 108 includes processing operations for determining contemporaneous sources for real time information.

The system 100 illustrates three sample contemporaneous sources 120a, 120b and 120c (collectively referred to as 120). The sources 120 can be any type of source that provides real-time information. A typical example may be a social network feed. For example, a Twitter® feed from various account users can be a real-time source. This real-time data feed provides large amounts of contemporaneous information, with significant uncertainty regarding the veracity of this information. Another source could be a really simple syndication (RSS) feed or other type of news or data feed, e.g. a stock ticker feed.

It is recognized that there are other types of information sources that provide real-time content and the sources 120 are not limited by the examples listed above. As the speed of information is received, there is the uncertainty of the trustworthiness of this information.

In the system 100, the user may enter a search request to the search engine 106 via the network 104. The search engine accesses the database 110 to find content results that answer the search inquiry, where based on the population module 108, the database 110 includes real-time information from the contemporaneous sources 120.

Figure 2:
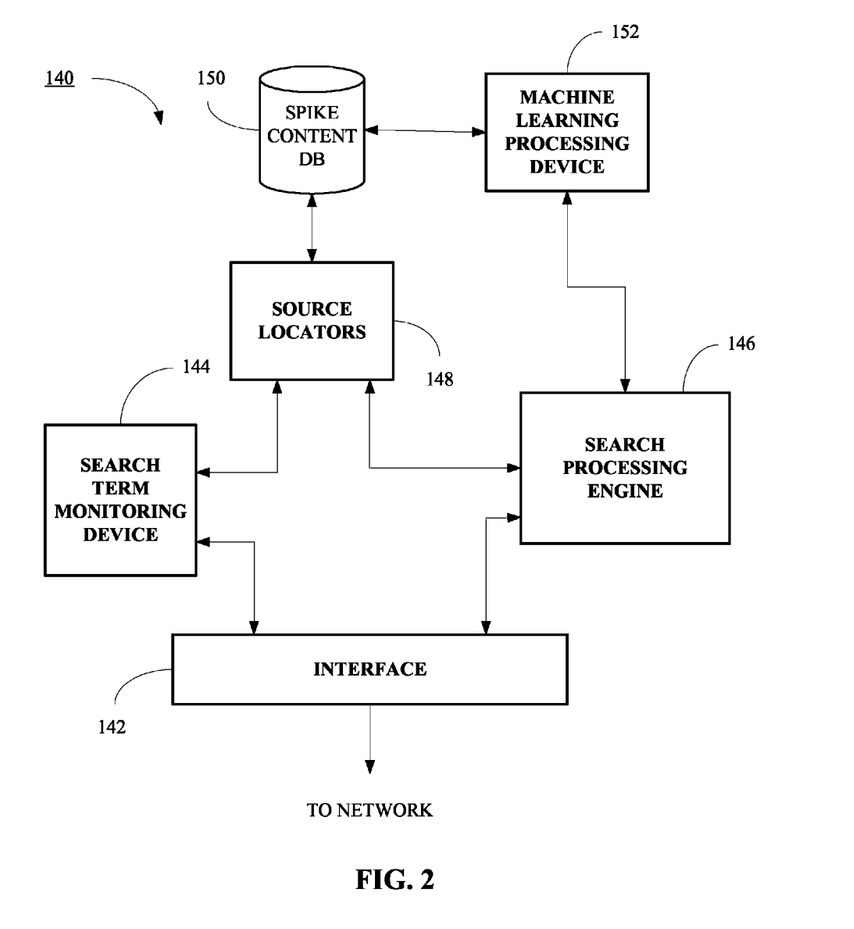
FIG. 2 illustrates one embodiment of a search engine including capabilities for processing contemporaneous information from real time sources and determining an authority rank for the real-time sources.

Search results are provided back to the user device 102. The ranking of these results are affected by a recognition in spike in user search activity and generating an authority rank. FIG. 2 describes in further detail one embodiment of processing operations and subsequent methodologies for processing the real time increase in search requests and providing improved search results to the user device 102.

FIG. 2 illustrates a system 140 including an interface 142, search term monitor 144, search processing engine 146, a source locator, 148, a spike content database 150 and a machine learning processing device 152. The system 140 may be embedded within or part of a larger search engine, such as the search engine 106 of FIG. 1, for example.

The interface 142 represents the computer executable code that provides the front-end user experience for search operations, such as the user entering search terms and receiving search results in response thereto. The search term monitor 144 may be a processing device or module that monitors search terms over periods of time to determine if there is a particular trend or a spike in activity. For example, a spike in activity may be determined by specific standards, such as if there are X number of search requests to the same common theme within Y seconds. Merely by way of example, a spike may including noting there are in excess of 10,000 searches for the same or common terms within a period of 30 seconds.

The search processing engine 146 is a processing device operative to process various aspects of the search engine operations. The engine 146 may include receipt of the search term, accessing a database of search results and then generating the search results page in response thereto. The engine 146 includes additional processing capabilities for real-time rank authority as described in further detail below.

The source locator 148 may be a processing device or a module of executable instructions, operative to perform operations relating to determining a content source and allowing for various processing operations relating to that source. As described in further detail below, it is important to find various information sources, typically contemporaneous sources, in real-time event search response scenarios. And when those sources are discovered, the system 140 is operative to thereby rank the sources to quantify the reliability of these sources, typically illustrated via the search result rankings The spike content database 150 is any suitable type of data storage device that stores spike information. This database 150 may include the storage of search query information, e.g. search query terms, search query rewrites, search result actions, etc. This information is then usable for tracking search query information over a period of time, as described in further detail below.

In this system 140, the machine learning processing device 152 is one or more processing devices operative to generate authority ranks The device 152 uses machine learning operations to evaluate the authority of the determined sources, where in one embodiment the device 152 may use known machine learning techniques for ranking source authority, techniques used in existing search engines for evaluating sources with existing crawling techniques to crawl web content. Whereas, in the present system 140, the timeliness of the real time authority rank complicates the machine learning process, such that the machine learning is modified to be performed in a more expedited manner.

Figure 3:
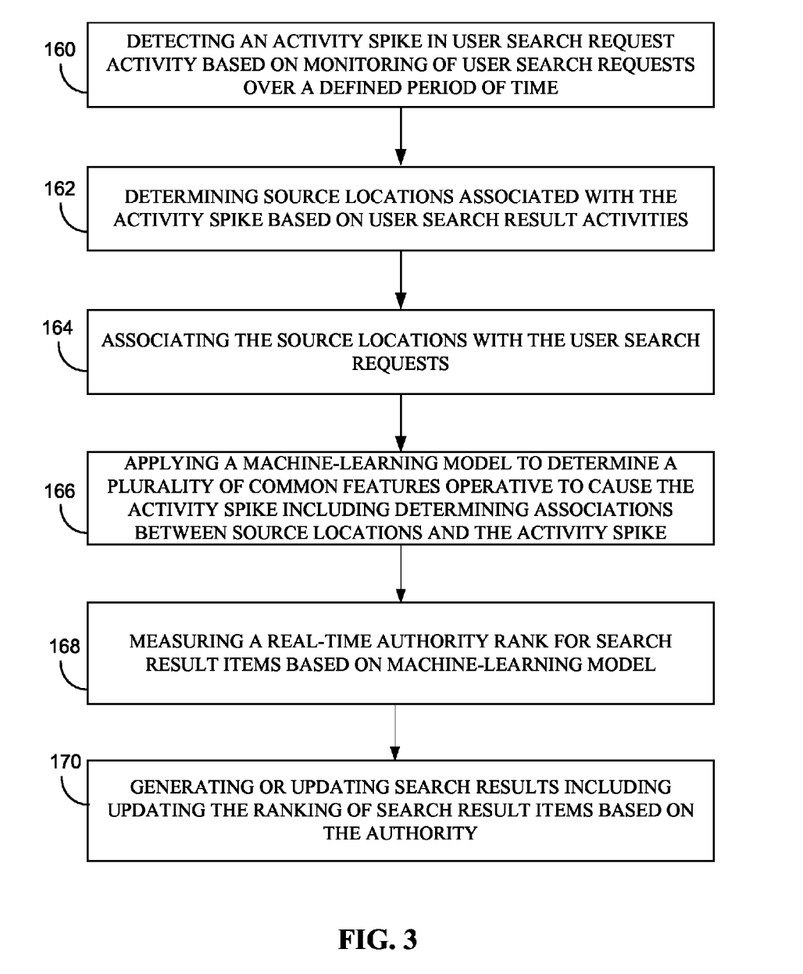
FIG. 3 illustrates a flowchart of the steps of one embodiment of a method for determining an authority rank for real time sources.
Figure 4:
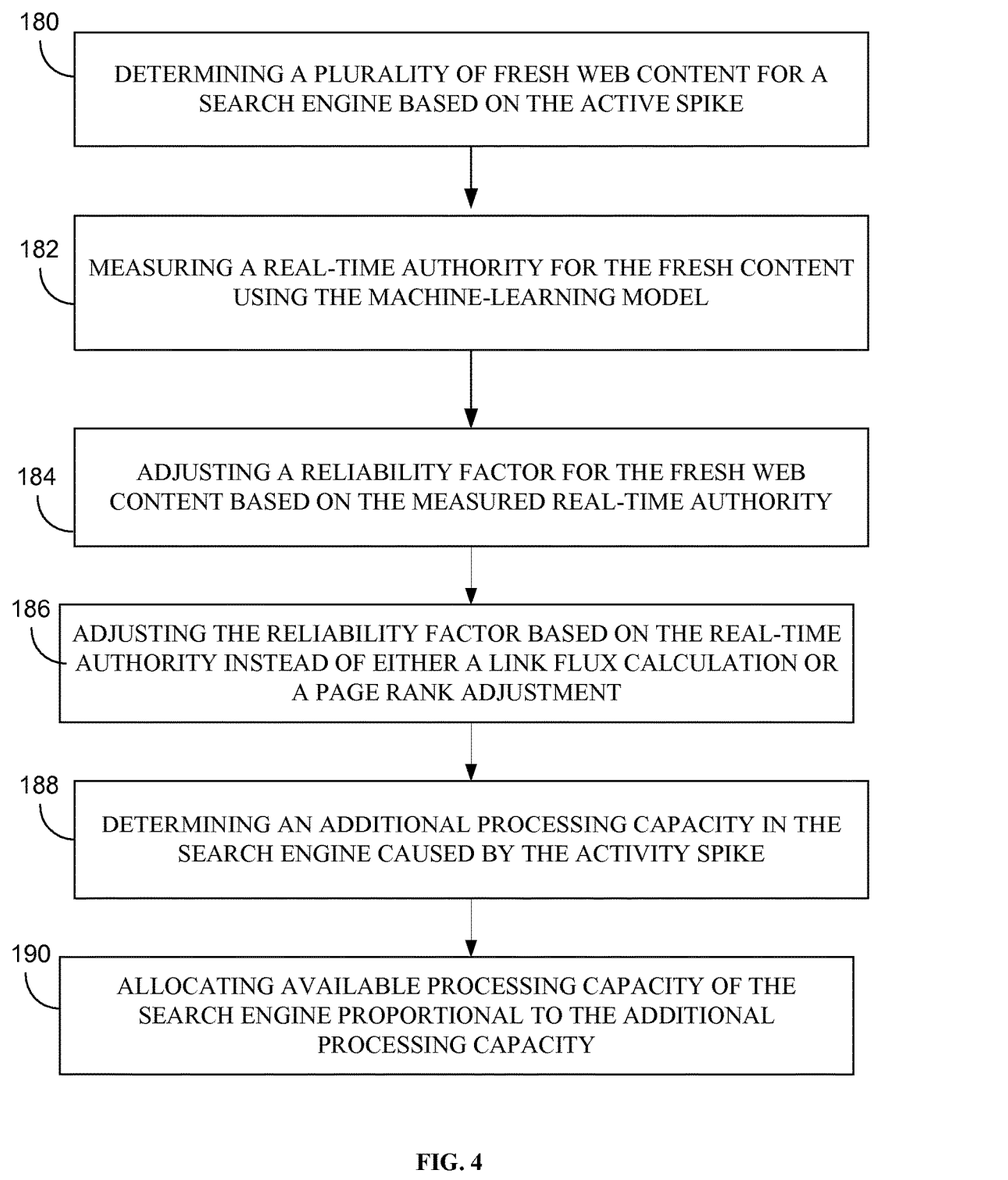
FIG. 4 illustrates a flowchart of the steps of another embodiment of a method for determining an authority rank for real time sources.

For further illustration of the systems of FIGS. 1 and 2, the operations of these systems are described in further detail regarding the methodologies of FIGS. 3 and 4.

FIG. 3 illustrates a flowchart of one embodiment of a method processing a real time increase in search requests for a common event. The method begins, step 160, by detecting an activity spike in user search request activity based on monitoring of user search requests over a defined period of time.

As described above, in a typical search engine, various amounts of searches are conducted on a regular basis. There are larger trends relating to common events, such as for example there may be an increase in searches for an actor or actress around the time a movie premieres, or general searches to a sporting event around the time the sporting event occurs.

By contrast, a spike in activity relates to an immediate jump in searching for information as may be caused by an immediate, typically unplanned event. Simply by way of example, an unplanned event may be a natural disaster, e.g. an earthquake in Haiti. The search engine 106, using the search term monitoring processing device 144, is therefore able to determine an activity spike by detecting that over a very short period of time there is an increase in the number of common searches. Using the example of a Haitian earthquake, the activity spike may be recognized as tens of thousands of searches for same or common terms, such as "Earthquake" and "Haiti."

The period of time can readily be adjusted to determine differences between a trend and an activity spike. A trend is more likely over an extended period of time, whereas an activity spike occurs in a truncated time period, whether it be seconds, minutes, hours, etc.

In the method of FIG. 3, a next step, step 162, is determining source locations associated with the activity spike based on user search result activities. The source locations for real-time activities include contemporaneous sources. Examples of contemporaneous sources may be any source that includes information in real time or in a timely fashion likely to be missed by web crawling techniques, for example a social network feed.

In this step, one example may be an event of a rumor of a high-tech product launch. A source location may be a technology blog dedicated to tracking and reporting on high tech rumors and news releases. Another source location may be a technical journal reporting on the blog article. This step may include determining that this web log and the journal articles are the sources of the activity spike. In the example of a natural disaster, the source of the activity spike may be a news web location reporting on the event in a breaking news fashion. Other sources could be social network feeds, for example, from individuals at the specification location.

A next step, step 164, is associating the source locations with the user search requests. Reference back to FIG. 2, the source locations 148 may determine these sources and the locations are stored in the spike content database 150. The locations can be stored and referenced by the associated search request and/or search terms. For example, in the example of a product launch, the web log and journal article may be cataloged in the spike content database 150 referenced by the search terms used in the spike of activity.

With a database cataloging the information, the machine learning processing device 152 is operative to perform the next step, step 166, of FIG. 3. The step includes applying a machine-learning model to determine a plurality of common features operative to cause the activity spike including determining associations between the source locations and the activity spike. It is recognized that there are any number of suitable machine-learning techniques operative to process the associations described herein, including in one embodiment machine-learning techniques applicable to web-crawling techniques in non-real time data processing and cataloging operations.

In step 168, the method further includes measuring a real-time authority rank for search result items based on the machine learning models. Based on this real time machine learning, the real-time authority indicates an authority ranking determinative of the veracity of the source. Using the above example of a rumored product launch, the web log may be given a high authority ranking based on the machine-learning factors indicating it is a highly trustworthy source.

By contrast, it is also possible that another source could be a secondary, less reliable web log indicating the product rumor. This less reliable web log may be less reliable for any number of reasons, such as it regularly broadcasts various rumors, is associated with a competing business, is associated with an illegal stock manipulation scheme, just by way of example. Using the machine learning operations of the machine learning processing device 152, this particular web location is then given a low authority for search results.

Based on determination of various sources, machine-learning processing and generating authority ranks, the search processing engine 146 is operative to generate search results for users performing search requests.

Step 170 of the method of FIG. 3 includes generating or updating search results including updating the ranking of search result items based on the authority rank. Thereby, in the system of FIG. 1, the client 102 submits the search request to the search engine 106, the search request being directed to a real time event causing a spike in user search activity. The search engine 106 is thereby operative to provide updated search results included results adjusted based on the authority rank generated via the methodology of the steps of FIG. 3.

FIG. 4 illustrates another embodiment, whereby processing operations provides for improving search results relating to real time event and activity spikes in searching, including processing information from contemporaneous sources. The method of FIG. 4 may be processed in the systems of FIGS. 1 and 2 or any other suitable processing environment.

In this embodiment, a first step, step 180, is determining a plurality of fresh web content for a search engine based on the active spike. The method of FIG. 4 may be predicated on the events of the method of FIG. 3, including the determination of an activity spike. The method of FIG. 4 provides additional processing operations to augment and/or supplement the search results with new and/or additional search results, such as may be found from contemporaneous sources, or at least via sources not yet captured using the web crawling techniques.

The determination of fresh web content may include direct web crawling techniques or searching contemporaneous feeds. For example, one technique may include searching a social network data feed of user submissions. The user submissions may be short messages, such as status updates or real-time messages, also colloquially known as a "tweet."

A next step, step 182, is measuring real-time authority for the fresh content using the machine-learning model. The measuring of the real-time authority for the fresh content may be performed using the machine learning processing device 152 of FIG. 2 as described in further detail above.

A next step, step 184, is adjusting a reliability factor for the fresh web content based on the measured real-time authority. The adjustment of the reliability factor includes utilizing the authority information from step 182. If the authority information indicates a high degree of trustworthiness, the reliability factor can be improved and if the authority information indicates a low degree of trustworthiness, the reliability factor can be lowered.

In this embodiment, a next step, step 186, is adjusting the reliability factor based on the real-time authority instead of either a link flux calculation or a page rank adjustment. Similar to step 184, the reliability factor is adjusted, but in step 186, there is a reduction in factors used for this calculation. The methodology of FIG. 4 does not require the steps to be in sequential order and various embodiments can include step 186 instead of step 184 or vice versa. Step 186 further modifies step 184 by eliminating the adjustment factors of the link flux calculation and the page rank adjustment.

A next step, step 188, is determining an additional processing capacity in the search engine caused by the activity spike. In this embodiment, a processing operation examines the processing load search engine 106 of FIG. 1 to account for this activity spike and the processing of real-time authority ranks as described above. This determination may be performed using any suitable processing technique, such as monitoring processing load allocations to search operations on a search processing environment and measuring the delta between before the activity spike and during the activity spike.

In the embodiment including step 188, an additional step, step 190, is allocating available processing capacity of the search engine proportional to the additional processing capacity. Therefore, in this embodiment, the search engine provides for processing capacity as needed, without seeking to lose or otherwise compromise processing operations relating to the non-activity spike information. It is recognized that just because there is a spike in user activity, there is still a need to maintain standard search engine operations, therefore by the allocation of step 190, attempts are made to maintain the search engine but also efficiently and effectively provide real-time source information whereby there is a real-time authority ranking for this information.

It is understood that search engines provides effective solutions to standard searching operations, but based on the crawling data cataloging nature of these systems, problems can arise in real time activities. Based on the detection of the activity spike and machine-learning processing, the present method and system provides not only time sensitive search results, but also performs machine-learning authority rank to improve the accuracy and benefit of the search results. The authority ranking allows for presentation of users with highest quality results in primary result positions, including account for contemporaneous sources as described above.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method implemented on a machine having at least one processor, storage, and a communication platform connected to a network for processing an activity spike in search requests for a common event, the method comprising:
    detecting an activity spike in user search request activity for one or more search terms associated with an event at an online search engine based on one or more user search requests monitored over a period of time, wherein:
        a first plurality of online source locations correspond to a source of the activity spike; and
        the first plurality of online source locations include information related to the one or more search terms;
    applying a machine learning model to determine a real-time authority rank among the first plurality of online source locations associated with the activity spike, wherein the real-time authority rank quantifies a degree of veracity and trustworthiness of the information from each of the first plurality of online source locations and is determined based on each online source location of the first plurality of online source locations;
    receiving a search request related to the one or more search terms;
    generating, in response to the search request, a second plurality of search results wherein at least one search result corresponds to at least one of the first plurality of online source locations;
    generating ranked search results by ranking the second plurality of search results based on the real-time authority rank for the at least some of the online source locations; and
    providing the ranked search results in response to the search request.

2. The method of claim 1 further comprising:
    determining a third plurality of fresh web content for the online search engine; and
    measuring a real-time authority for the fresh web content using the machine-learning model.

3. The method of claim 2, further comprising:
    adjusting a reliability factor for the third plurality of fresh web content based on the real-time authority.

4. The method of claim 3, wherein adjusting the reliability factor based on the real-time authority is performed instead of at least one of a link flux calculation and a page rank adjustment.

5. The method of claim 2, further comprising:
    determining the one or more search terms of the user search requests associated with the activity spike; and
    determining a fourth plurality of additional content sources associated with the one or more search terms.

6. The method of claim 5, further comprising:
    ranking the fourth plurality of additional content sources based on the real-time authority.

7. The method of claim 6, further comprising:
    determining an additional processing capacity in the search engine caused by the activity spike; and
    allocating available processing capacity of the search engine proportional to the additional processing capacity.

8. The method of claim 1, wherein each of the first plurality of online source locations is stored and referenced by at least one of: the one or more search terms and the one or more search requests.

9. The method of claim 1, wherein the real-time authority rank for each online source location of the first plurality of online source locations is further determined based on whether each online source location is associated with an illegal stock manipulation scheme.

10. A system having at least one processor and storage for processing an activity spike in search requests for a common event, the system comprising:
    a computer readable medium having executable instructions stored therein; and
    a processing device, in response to the executable instructions, operative to:
        detect an activity spike in user search request activity for one or more search terms associated with an event at an online search engine based on one or more user search requests monitored over a period of time involving, wherein:
            a plurality of online source locations correspond to a source of the activity spike and the first plurality of online source locations include information related to the one or more search terms;
        apply a machine learning model to determine a real-time authority rank among the first plurality online source locations associated with the activity spike, wherein the real-time authority rank quantifies a degree of veracity and trustworthiness of the information from each of the first plurality online source locations and is determined based on each online source location of the first plurality of online source locations;
        receive a search request related to the one or more search terms;
        generate, in response to the search request, a second plurality of search results wherein at least one search result corresponds to at least one of the first plurality of online source locations;
        generate ranked search results by ranking the second plurality of search results based on the real-time authority rank for the at least some of the online source locations; and
    provide the ranked search results in response to the search request.

11. The system of claim 10, wherein the processing device is further operative to:
    determine a third plurality of fresh web content for the online search engine; and
    measure a real-time authority for the fresh web content using the machine-learning model.

12. The system of claim 11, wherein the processing device is further operative to:
    adjust a reliability factor for the third plurality of fresh web content based on the real-time authority.

13. The system of claim 12, wherein the reliability factor being adjusted based on the real-time authority is performed instead of at least one of a link flux calculation and a page rank adjustment.

14. The system of claim 11, wherein the processing device is further operative to:
    determine the one or more search terms of the user search requests associated with the activity spike; and
    determine a fourth plurality of additional content sources associated with the one or more search terms.

15. The system of claim 14, wherein the processing device is further operative to:
rank the fourth plurality of additional content sources based on the real-time authority.

16. The system of claim 15, wherein the processing device is further operative to:
determine an additional processing capacity in the search engine caused by the activity spike; and
allocate available processing capacity of the search engine proportional to the additional processing capacity.

17. A machine readable non-transitory medium comprising first information for processing an activity spike in search requests for a common event, wherein the first information, when read by the machine, causes the machine to perform the following:
detecting an activity spike in user search request activity for one or more search terms associated with an event at an online search engine based on one or more user search requests monitored over a period of time, wherein:
a first plurality of online source locations correspond to a source of the activity spike and the first plurality of online source locations include information related to the one or more search terms;
applying a machine learning model to determine a real-time authority rank among the first plurality of online source locations associated with the activity spike, wherein the real-time authority rank quantifies a degree of veracity and trustworthiness of the information from each of the first plurality of online source locations and is determined based on each online source location of the first plurality of online source locations;
receiving a search request related to the one or more search terms;
generating, in response to the search request, a second plurality of search results wherein at least one search result corresponds to at least one of the first plurality of online source locations;
generating ranked search results by ranking the second plurality of search results based on the real-time authority rank for the at least some of the online source locations; and
providing the ranked search results in response to the search request.

18. The medium of claim 17, wherein the first information, when read by the machine, further causes the machine to perform the following:
determining a third plurality of fresh web content for the online search engine; and
measuring a real-time authority for the fresh web content using the machine-learning model.

19. The medium of claim 18, wherein the first information, when read by the machine, further causes the machine to perform the following:
adjusting a reliability factor for the third plurality of fresh web content based on the real-time authority.

20. The medium of claim 19, wherein adjusting the reliability factor based on the real-time authority is performed instead of at least one of a link flux calculation and a page rank adjustment.

21. The medium of claim 18, wherein the first information, when read by the machine, further causes the machine to perform the following:
determining the one or more search terms of the user search requests associated with the activity spike; and
determining a fourth plurality of additional content sources associated with the one or more search terms.

22. The medium of claim 21, wherein the first information, when read by the machine, further causes the machine to perform the following:
ranking the fourth plurality of additional content sources based on the real-time authority.

23. The medium of claim 22, wherein the first information, when read by the machine, further causes the machine to perform the following:
determining an additional processing capacity in the search engine caused by the activity spike; and
allocating available processing capacity of the search engine proportional to the additional processing capacity.

* * * * *